US006923116B2

(12) United States Patent
Wicha

(10) Patent No.: US 6,923,116 B2
(45) Date of Patent: Aug. 2, 2005

(54) SHUNTING TRACK IN A TRANSPORT DEVICE

(75) Inventor: Lothar Johann Wicha, Marktheidenfeld (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 10/475,847

(22) PCT Filed: May 2, 2002

(86) PCT No.: PCT/DE02/01588

§ 371 (c)(1),
(2), (4) Date: Oct. 31, 2003

(87) PCT Pub. No.: WO02/090115

PCT Pub. Date: Nov. 14, 2002

(65) Prior Publication Data

US 2004/0099161 A1 May 27, 2004

(30) Foreign Application Priority Data

May 5, 2001 (DE) ........................................ 101 21 943

(51) Int. Cl.[7] .......................... B41L 47/46; B41F 13/02; G03B 1/56

(52) U.S. Cl. ........................... 101/91; 101/92; 101/219; 101/228; 101/483; 226/91; 226/92; 242/531.1; 242/532.7

(58) Field of Search ....................... 226/91, 92; 101/91, 101/92, 219, 228, 483; 242/531.1, 532.7

(56) References Cited

U.S. PATENT DOCUMENTS 3,761,001 A * 9/1973 Bolza-Schunemann et al. .. 101/228
4,370,927 A 2/1983 Fischer
5,052,295 A * 10/1991 Suzuki et al. ............... 101/227
5,172,844 A * 12/1992 Mueller ......................... 226/7
5,263,414 A * 11/1993 Lehrrieder et al. ......... 101/228
5,297,376 A 3/1994 Taguchi et al.
5,320,039 A 6/1994 Reponty et al.
5,370,290 A * 12/1994 Gilliland ..................... 226/108
5,400,940 A * 3/1995 Sato et al. .................... 226/92
5,581,908 A 12/1996 Theilacker
5,809,892 A 9/1998 Kruger et al.
5,816,465 A * 10/1998 Suzuki ........................ 226/92
5,947,361 A * 9/1999 Berger et al. ................. 226/92
5,967,036 A 10/1999 Marmin et al.
6,142,074 A * 11/2000 Flament ...................... 101/219
6,341,861 B1 * 1/2002 Sasaki ........................ 347/104
6,443,061 B1 * 9/2002 Suzuki ....................... 101/228

FOREIGN PATENT DOCUMENTS

| | | |
|---|---|---|
| DE | 80 11 068 | 7/1980 |
| DE | 42 22 090 C2 | 7/1996 |
| DE | 43 25 251 C2 | 9/1997 |
| DE | 196 21 507 C1 | 9/1997 |
| DE | 198 02 194 A1 | 10/1998 |
| EP | 0 544 088 A1 | 6/1993 |
| EP | 0 418 903 A2 | 3/1994 |

* cited by examiner

*Primary Examiner*—Daniel J. Colilla
*Assistant Examiner*—Marvin Crenshaw
(74) *Attorney, Agent, or Firm*—Jones Tullar & Cooper PC

(57) ABSTRACT

A shunt track is provided in a transport device for drawing in a length of material through the use of a drawing mechanism which is guided by the track. The shunt track includes a first guide section with one end that is selectively alignable with a second or a third guide section. A second end of the first guide section is fixed in place.

18 Claims, 3 Drawing Sheets

SHUNTING TRACK IN A TRANSPORT DEVICE

The present invention is directed to a shunt of a transport device. The shunt has at least one guide section that can selectively be brought into flush alignment with the start of a second or a third guide section.

BACKGROUND OF THE INVENTION

A shunt for draw-in elements being guided in a guide element is known, inter alia, from DE 196 21 507 C1. In one embodiment of this prior device, sections of varied curvature are arranged on a disk, which disk can be rotated by the use of an actuating element. A shunt is shown in another representation, wherein a guide element, which is arranged in the area of a fork and which is rotatable around a center of rotation, in a first position guides the draw-in device into a first transport track and, in a second position, guides the draw-in device into a second transport track.

DE 42 22 090 C2 discloses a shunt for sorting sheets of paper into different compartments of a copier. Sorting guides, which have a curved shape, can be pivoted, by the use of a solenoid, around a fixed center of rotation into the line along which the paper falls.

EP 0 418 903 A2 discloses a shunt for a draw-in device, in which, in the course of a change from a first to a further draw-in path, a fixed guide section is maintained independently of the position of the shunt. A relative movement between at least two of the partial sections constituting the guide section is required for changing the draw-in path.

SUMMARY OF THE INVENTION

The object of the present invention is directed to providing a shunt of a transport device.

In accordance with the invention, this object is attained by providing a shunt that has a first guide section which has one end that can selectively be brought into flush alignment with the start of at least a second or a third guide section while an area of the first guide section is fixed in place and thus remains as a guide section. The end of the first guide section can be brought into flush alignment by reversible deformation. Alternatively, a portion of the first guide section is pivotable by the provision of at least one hinge.

The advantages to be gained by the present invention lie, in particular, in that a shunt is created, which can be produced simply and cost-effectively and which is flexibly usable.

Because of the capability of simply constructing and installing the shunt, it can be matched to the existing conditions or circumstances directly at its place of employment, if desired, without any large outlay. The shunt can be employed in many ways and without a large outlay, since no differently preassembled, for example differently curved, guide sections need to be completely exchanged between two interfaces. Instead, an existing guide section can be deflectable at only one end in accordance with the existing requirements and can be retained in a deflected position.

Furthermore, the shunt is not sensitive to dirt and requires little maintenance. This is true, in particular, in an embodiment of the shunt which does not require hinges or the like.

Depending on the requirements or on the existing local conditions, the drive mechanism for the shunt can be embodied in the form of a cylinder. The cylinder can be charged with a pressure medium, or can also be electrically actuable.

In an advantageous embodiment of the present invention, the guide has two strips of material which are located almost parallel opposite to each other in the area of the shunt. These two strips of material can be reversibly bent and are embodied without a "back" connecting the strips of material in the entire area of the shunt. Material strips which have an almost rectangular, non-profiled cross section are particularly advantageous.

If the shunt is employed within a guide device for a conveyor chain, strips or spacers, which are spaced apart from each other in the transport direction, are advantageous in the area of the "back", i.e. on the side of guide device opposite the web of material to be drawn in. A slight profiling of the surfaces facing each other, i.e. of the running surfaces of the rollers, is also advantageous.

Together with draw-in devices that are embodied in the manner of a belt, the guide device can also have actuating members in the form of resilient elements or lift cylinders in the area of the shunt, which maintain the belt in a guided manner.

BRIEF DESCRIPTION OF THE DRAWINGS

A preferred embodiment of the present invention is represented in the drawings and will be described in greater detail in what follows.

Shown are in.

DESCRIPTION OF THE PREFERRED EMBODIMENT

Figure 1:
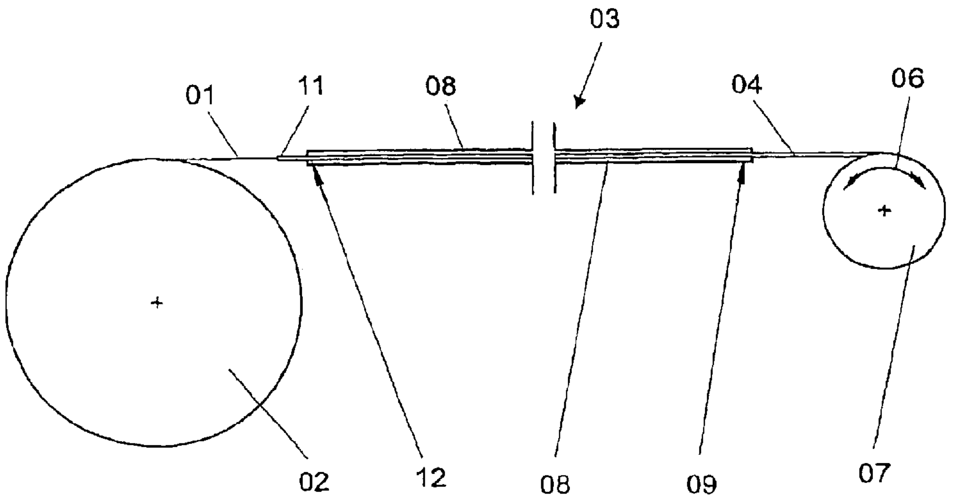
FIG. 1, a schematic representation of a device for use in drawing in a web of material, in FIG. 2, an enlarged view of a portion of the device in accordance with FIG. 1, in FIG. 3, the device for drawing in a web of materials in accordance with FIG. 1, in cross section, in FIG. 4, an enlarged cross-sectional view of a portion of the device in accordance with FIG. 3, and in FIG. 5, a shunt in accordance with the present invention for use in a device for drawing in a web of material in accordance with FIG. 1.

A device for use in drawing in a start of a web of material is represented schematically in FIG. 1. A web draw-in device 03 is provided for drawing in a web 01 of material, for example a web 01 embodied in the form of a paper web wound up on a roll 02, into a machine, which is not specifically represented, for example a rotary printing press. A draw-in belt is used as the transporting mechanism 04, for example as the draw-in mechanism 04, into the web draw-in device 03, which draw-in belt can be wound onto a reel 07 which is driven in the direction shown by the movement arrow 06 and can be guided through the rotary printing press, which is not specifically represented, along a desired draw-in track in a guide element 08, which is depicted in a broken-open view in FIG. 1.

If a roll change is executed, or if a partial web draw-in is required after a web break, the draw-in mechanism 04 is pushed, starting at the downstream or second end 09 of the guide element 08, by operation of the drive mechanism of the reel 07 in a counterclockwise direction through the guide element 08 until a connecting assembly 11, for example a draw-in tip connecting assembly 11, at the upstream or first end 12 of the guide element 08 extends out of the area of the roll changer, or is arranged in the area of the web break. Then the start of the web 01 of material is connected with the draw-in mechanism 04 and is pulled in a clockwise direction along the desired draw-in path through the rotary printing press by operation of the drive mechanism of the reel 07.

Figure 2:
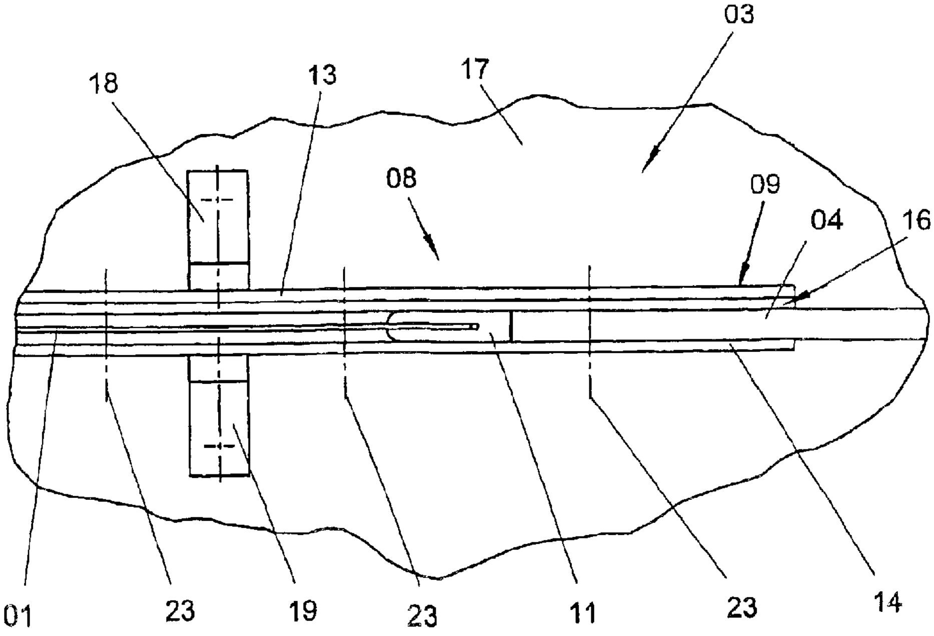

FIG. 2 shows an enlarged portion of the web draw-in device 03 in the area of the downstream or second end 09 of the guide element 08. The guide element 08 is constituted by two strips of material 13, 14 made, for example, from sheets of spring-steel, wherein the draw-in mechanism 04 is guided in a guide groove 16, which is formed by the strips of material 13, 14, and which guide groove 16 is bordered on the one side by a lateral frame 17. The guide element 08 can also be made of other strip-shaped components, such as flat roller cages.

Figure 4:
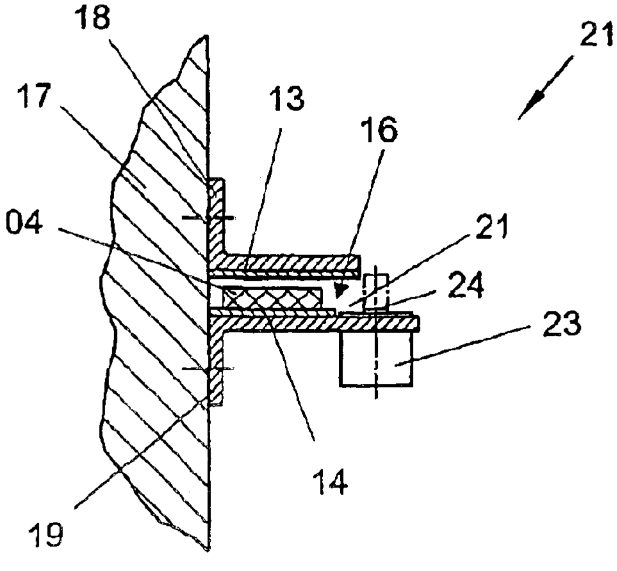

Holder elements 18, 19, as seen in FIG. 4, are arranged in pairs. Each holder element 18, 19 has one leg which is secured on the outside of one of the strips of material 13, 14, and has a second leg which is fixed on the lateral frame 17. These holder elements 18, 19 are used for fixing the strips of material 13, 14 in place, for example, in the area of the lateral frame 17.

The guide groove 16, which is constituted by the strips of material 13, 14, is open on a side 21 located opposite the lateral frame 17, as may be seen in FIG. 4, which open side 21 of guide groove 16 is provided so that the draw-in mechanism 04, or a draw-in tip portion of the draw-in mechanism 04, which is not specifically represented, can exit the guide groove 16 in accordance with its width at this open side location 21 during the draw-in process.

Figure 3:
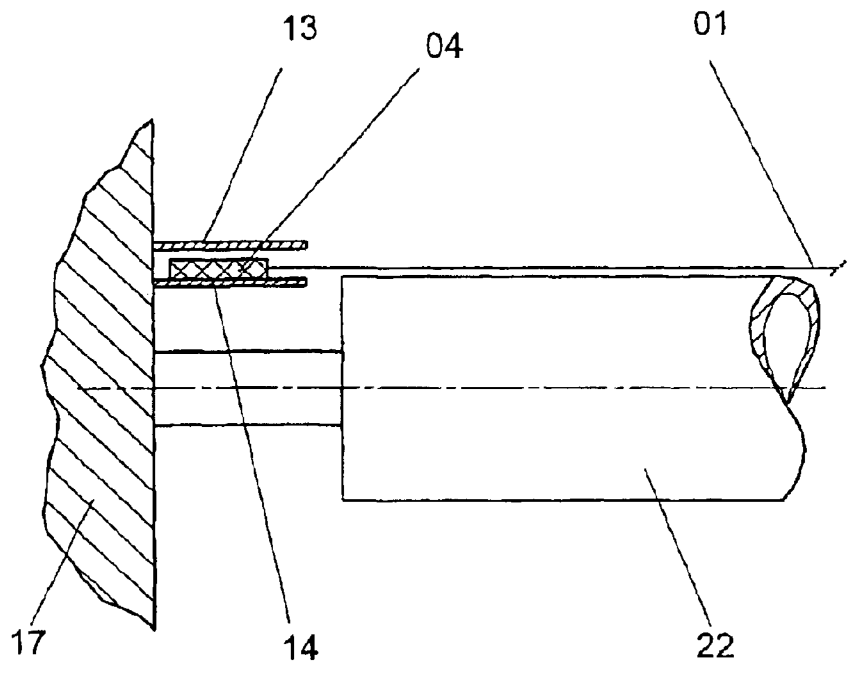

As represented in FIG. 3 the web 01 of material can be pulled, driven by the draw-in mechanism 04, through a rotary printing press, for example above a paper guide roller 22.

Since the guide groove 16 is formed by the flat, typically smooth-faced and non-profiled strips of materials 13, 14, the guide groove 16 does not form guiding contact faces for the lateral face of the draw-in mechanism 04 in the area of the open side 21 of the draw-in mechanism 04, so that with long draw-in paths, there is the danger that the draw-in mechanism 04 might inadvertently exit the guide groove 16 at the open location 21 and thus could lose its guidance because of this. To prevent this, actuating members 23, as are schematically represented in FIG. 2, are arranged along the guide element 08 at defined distances from each other. By operation of these actuating members 23 the open side of the guide groove 16 can be closed.

FIG. 4 more clearly depicts the function of the actuating members 23 which may be, for example, embodied as short-stroke cylinders 23, in the course of the guidance of the draw-in mechanism 04 in the guide groove 16. The actuating members 23 can also be embodied as spring elements 23, for example as spring sheet metal plates 23, which maintain the draw-in mechanism 04 in the area of the guide groove 16. During the passage of a draw-in tip, which is not specifically represented, and which is arranged on the draw-in mechanism 04, the actuating members 23 can be briefly pushed out of the area of the open side 21.

The lifting rod 24 of the actuating member 23, which is embodied as a short-stroke cylinder 23 can be extended and retracted by remote control, with the extended position being indicated by dashed lines in FIG. 4. If the lifting rod 24 is extended, the draw-in mechanism 04 can come into contact laterally with the lifting rod 24, so that the exit of the draw-in mechanism 04 from the guide groove 16 is dependably prevented. As soon as the connecting assembly 11, along with a web 01 of material, arrives in the area of an actuating member 23, the lifting rod 24 is retracted, so that the web 01 of material, or the draw-in tip, that is projecting laterally out of the guide groove 16 is not damaged. In the course of pushing the connecting assembly 11 forward from the downstream or second end 09 of the guide element 08 to the upstream or first end 12, all lifting rods 24 along the guide element 08 are extended in order to maintain the draw-in mechanism 04 inside the guide device 08 along the draw-in path.

If the actuating member 23 is embodied as a spring element 23, it is advantageous if it can be displaced along the draw-in direction by the use of a force component from the connecting assembly 11, the draw-in tip, or the web 01 of material, and can be actuated in this way. After the passage of the connecting assembly 11, the draw-in tip, or the web 01, the spring element 23 again springs back into the area of the open side 21.

Figure 5:
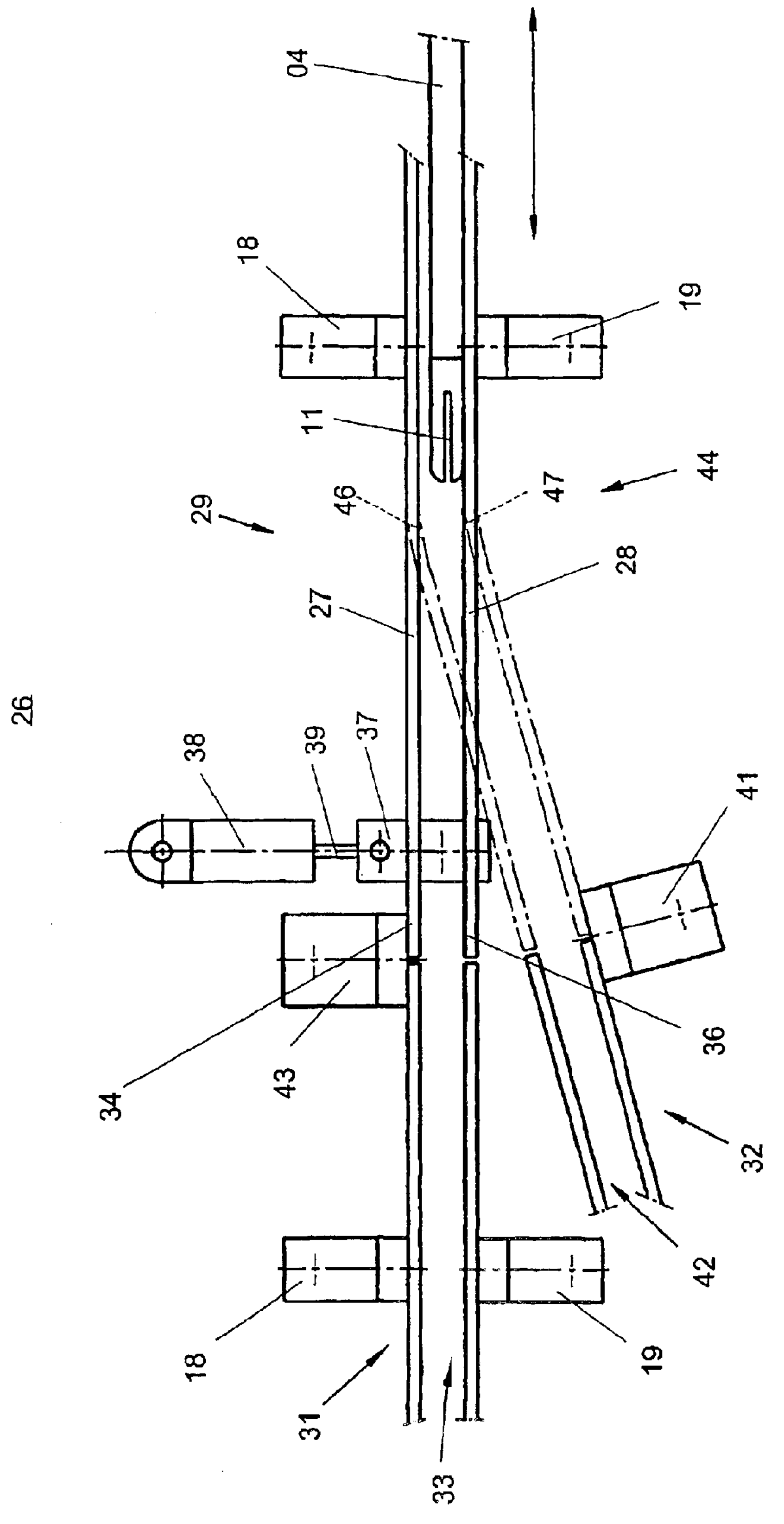

A shunt 26 for redirecting the draw-in mechanism 04 along various draw-in tracks in the rotary printing press is represented in FIG. 5. Two additional guide strip sections or guide strips 31, 32 are arranged opposite a first guide strip section or guide strip 29 formed by the strips of material 27, 28. For guidance purposes, the strips of material 27, 28 have two oppositely located guide faces. These strips of material 27 and 28 of the first guide section 29 of FIG. 5 are analogous to the strips of material 13 and 14 of the guide element 08 of FIGS. 1–4.

In an initial position of the shunt 26, as represented in FIG. 5, the first and second guide sections 29, 31, respectively, which are of complementary shape, are located in line with each other, so that the draw-in mechanism 04 can be guided in a straight line along the continuous guide groove 33 being formed by this alignment of the first and second guide strips or guide sections 29, 31.

A connecting member 37, which is shaped in the form of a letter C, is fastened to adjacent ends 34, 36 of the two strips of material 27, 28 of the first guide section 29 and assures that a defined spacing distance between the strips of material 27, 28 will be maintained. The connecting member 37 is furthermore hingedly connected with an actuator 38, which may be embodied in the manner of a cylinder 38 which can be charged with a pressure medium, for example as a lift cylinder. Connecting member 37 can be displaced downward by controlling the actuator 38.

If a lifting rod 39 of the actuator 38 is extended, the ends 34, 36 of the flexible strips of material 27, 28, which, in the first preferred embodiment, are embodied to be reversible and deformable, are pushed downward by the connecting member 37 until the lower strip end 36 of the first guide strip section 29 comes to rest against a lower stop 41. In this position, which is indicated by dashed lines in FIG. 5, the first guide section 29 and the third guide section 32 now form a continuous guide groove 42, in which the draw-in mechanism 04, coming from the first guide section 29, can be downwardly deflected. If the direction of the shunt 26 is to be changed back to its initial position depicted in solid lines in FIG. 5, the lifting rod 39 is retracted until the upper end 34 of the strip of material 27 comes to rest against an upper stop element 43 and therefore has again been placed its initial position. In this case, an area of the first guide section 29 is not deflected and remains fixed in place. At least the segment of the first guide strip section 29 between the last holder 18, 19 and the repositionable end 34, 36 is embodied to be reversibly deformable, or has at least areas which are reversibly deformable. Therefore, the transition area from the resiliently deformable portion of the guide section 29, which transition area performs a directional change when actuated, to the stationary portion of the guide section 29, which is, as a rule the section after last holder 18, 19, thus constitutes a start 44 of the shunt 26.

In the case of the first guide section 29, which can be resiliently deformed in at least some areas, the first guide section 29 can also be embodied in one piece instead of using the two oppositely located strips of material 27, 28. This deformable area then is embodied in the form of a guide element such as disclosed in DE 43 05 955 C1, for example, now U.S. Pat. No. 5,396,982, and to whose disclosure explicit reference is made at this point and which is hereby incorporated by reference. Then only one of the two strips of material 27, 28 is embodied to be continuous, while the other strip of material 28, 27 and a back connecting the two strips of material 27, 28, has at least one opening which allows the bending, i.e. a deformation, of the respective area. This section, or area, is then embodied to be slit, for example.

The guide elements 08 of the guide sections 29, 31, 32 adjoining the shunt area can then be configured in the manner of the guide elements in DE 43 05 955 C1.

Alternatively, or in addition to the resilient deformability of the first guide section 29, it is also possible to arrange a hinge 46, 47 or, in the case of two individually movable strips of material 27, 26, two hinges 46, 47, which then constitute the start 44 of the shunt 26 and which permit pivoting of the shunt 26 so that its movable end will be aligned selectively with an adjacent end of one of the two adjacent guide strip sections 31 or 32, as depicted in FIG. 5.

The shunt 26 can also be embodied for differently configured guide sections 29, 31, 42, again wherein the two oppositely located guide faces of a first guide section 29 can be deflected or pivoted together and, while maintaining their distance from each other, can be selectively aligned flush with the start of a second or third guide section 31,32.

The actuator 38 can also be embodied in a different way. For example, it can be electrically actuable as a mechanically displaceable threaded spindle, or as an electromagnet.

While preferred embodiments of a shunting track in a transport device, in accordance with the present invention, have been set forth fully and completely hereinabove, it will be apparent to one of skill in the art that various changes in for example, the specific structure of the draw-in mechanism and of the connecting assembly, as well as in the structure and operation of the drive for the draw-in mechanism, could be made without departing from the true spirit and scope of the present invention which is accordingly to be limited only by the following claims.

What is claimed is:

1. A shunt of a transport device adapted for drawing in a web of material comprising:

a first guide section having a first end and a second end;
a second guide section having a first end;
a third guide section having a first end;
means for shifting said first end of said first guide section selectively into flush alignment with one of said first end of said second guide section and said first end of said third guide section while said second end of said first guide section remains fixed; and
a reversibly deformable portion of said first guide section intermediate said first guide section movable first end and said first guide section fixed second end.

2. The shunt of claim 1 further including a holder for said first guide section and wherein said reversibly deformable section is between said holder and said first end of said first guide section.

3. The shunt of claim 1 wherein said first guide section includes first and second strips of material located at least partially parallel each other.

4. The shunt of claim 3 wherein said first and second strips of material can be deflected with respect to each other while maintaining their distances from each other.

5. The shunt of claim 3 wherein said first and second strips of material are sheet metal strips.

6. The shunt of claim 5 wherein said sheet metal strips are spring steel.

7. The shunt of claim 3 further including an actuator and wherein said first and second strips of material can be deflected in the area of said first end of said first guide section by said actuator.

8. The shunt of claim 1 wherein said first guide section includes spaced guide faces which can be deflected in respect to each other while maintaining a spacing distance from each other.

9. The shunt of claim 1 wherein said means for shifting said first end of said guide section includes an actuator.

10. The shunt of claim 9 wherein said actuator is a cylinder which can be charged with a pressure medium.

11. The shunt of claim 1 further including a stop element, said first end of said first guide section being engageable with said stop element.

12. A shunt of a transport device adapted for drawing in a web of material comprising:

a first guide section having a first end and a second end;
first and second strips of material in said first guide section, said first and second strips of material being located at least partially parallel to each other and defining an open side facing a web of material;
an actuating member adapted to close said open side;
a second guide section having a first end;
a third guide section having first end;
means for shifting said first end of said first guide section selectively into flush alignment with one of said first end of said second guide section and said first end of said third guide section while said second end of said first guide section remains fixed; and a pivotable section of said first guide section intermediate said first end and said second end of said first guide section, said pivotable section including at least one hinge.

13. The shunt of claim 12 wherein said first guide section includes spaced guide faces which can be deflected in respect to each other while maintaining a spacing distance from each other.

14. The shunt of claim 12 wherein said first and second strips of material can be deflected with respect to each other while maintaining their distances from each other.

15. The shunt of claim 12 wherein said first and second strips of material are sheet metal strips.

16. The shunt of claim 15 wherein said sheet metal strips are spring steel.

17. The shunt of claim 12 further including an actuator and wherein said first and second strips of material can be deflected in the area of said first end of said first guide section by said actuator.

18. A shunt of a transport device adapted for drawing in a web of material comprising:

a first guide section having a first end and a second end;

first and second strips of material in said first guide section, said first and second strips of material being located at least partially parallel to each other, said first guide section defined by said first and second strips of material including an open side facing a web of material, and further including an actuating member adapted to close said open side;

a second guide section having a first end;

a third guide section having a first end;

means for shifting said first end of said first guide section selectively into flush alignment with one of said first end of said second guide section and said first end of said third guide section while said second end of said first guide section remains fixed; and a reversibly deformable portion of said first guide section immediate said first guide section movable first end and said first guide section fixed second end.

* * * * *